United States Patent [19]

Nemecek et al.

[11] Patent Number: 4,759,945

[45] Date of Patent: Jul. 26, 1988

[54] PROCESS FOR DRESSING AND/OR ENCRUSTING SEED GRAINS

[75] Inventors: Franz Nemecek, Duesseldorf; Karl-Heinz Eiteneuer, Wiehl; Gunter Heinrich, Leverkusen, all of Fed. Rep. of Germany

[73] Assignee: Bayer Aktiengesellschaft, Leverkusen, Fed. Rep. of Germany

[21] Appl. No.: 47,240

[22] Filed: May 7, 1987

[30] Foreign Application Priority Data

May 13, 1986 [DE]  Fed. Rep. of Germany ....... 3616010

[51] Int. Cl.$^4$ ............................................... A01G 5/06
[52] U.S. Cl. ........................................... 427/4; 47/58; 427/346
[58] Field of Search ............... 427/4, 213, 346; 118/5

[56] References Cited

U.S. PATENT DOCUMENTS

| 2,954,643 | 10/1960 | Porter et al. ........................... 47/58 |
| 3,911,183 | 10/1975 | Hinkes .................................. 427/213 |
| 4,034,126 | 7/1977 | Funakoshi et al. .................. 427/213 |
| 4,238,523 | 12/1980 | Porter et al. ............................. 427/4 |
| 4,258,074 | 3/1981 | Grim et al. ............................... 427/4 |
| 4,344,979 | 8/1982 | Gago et al. .............................. 427/4 |
| 4,424,199 | 1/1984 | Iya ........................................ 427/213 |
| 4,532,155 | 7/1985 | Golant et al. ......................... 427/346 |
| 4,657,773 | 4/1987 | Mueller .................................... 427/4 |

FOREIGN PATENT DOCUMENTS 554734 6/1932 Fed. Rep. of Germany .
2354147 1/1978 France .
2164587 3/1986 United Kingdom .

Primary Examiner—Thurman K. Page
Assistant Examiner—L. R. Horne
Attorney, Agent, or Firm—Sprung, Horn, Kramer & Woods

[57] ABSTRACT

Seed grains are dressed and/or encrusted with an aqueous dressing and/or encrusting liquid wherein the liquid contains a relatively large amount of water and the treated seed grains are dried very rapidly in a pneumatic conveyor pipeline.

8 Claims, 1 Drawing Sheet

PROCESS FOR DRESSING AND/OR ENCRUSTING SEED GRAINS

The present invention relates to a process for dressing and/or encrusting seed grains using liquid dressing and/or encrusting agents based on water.

In order to prevent infestation of the seed used in agriculture with fungi or diseases, it is coated with various active compounds before sowing. In more recent times, such substances are used in aqueous form as a solution or suspension. For this purpose, active compounds such as triadimenol, mercaptodimethur, inter alia, are employed.

Several processes are known by which the seed is sprayed in diverse dressing machines having a spraying device such as a spray disc or nozzle in order to redistribute the seed in a subsequent mixing process in a drum worm or similar apparatus. The object of these processes is to achieve uniform coating of the grains, so that all grains finally receive a uniform coat over their entire surface and, in addition, each seed grain has exactly the same quantity of active compound(s).

A disadvantage of the known processes is that the amount of water used to apply the active compounds must be very small since the seed would otherwise stick together in the sacks or even germinate prematurely on subsequent storage. 400 to 600 ml of solution which contain about 150 grams of different active compounds are usually used for treating 100 kg of seed by the known processes. In practice, this small amount of liquid cannot be distributed completely uniformly on all grains and the underdressed grains are then the cause of poor yields from the seed.

It has been found that seed grains can be dressed and/or encrusted significantly better, more simply and more gently if they are treated for a short period with an aqueous dressing and/or encrusting liquid and the seed grains thus treated are dried very rapidly in a pneumatic conveyor pipeline.

In the process according to the invention, relatively large amounts of water are used. Preferably, 1 to 2.5 liters of water are employed per 100 kg of seed in the aqueous dressing and/or encrusting liquid.

The process can be described in detail as follows:

The seed is initially wetted with the active compound solution or suspension using a large amount of water, from 1 to 2.5 liters of water per 100 kg of seed. Commercially available dressing machines which are fitted with spray discs or nozzles are suitable for this purpose. However, it has surprisingly been found that, in contrast to general opinion, spraying parts are not necessary if the liquid is metered directly into a simple brush-type worm conveyor, the seed passing through the brush-type worm preferably in a maximum of 10 seconds and, more preferably, 1 to 3 seconds and the seed being sluiced into the pneumatic conveyor section for drying at speeds of about 800 to about 1,400 revolutions per minute. Suitable brush-type worm conveyors have, for example, a diameter of about 0.1 m and a length of about 2 m.

In the search for suitable drying processes, it was surprisingly established, that, what the wet seed grains, such as, for example, rape seed, cereals or maize, are blown through a vertically arranged pneumatic conveyor section, the surface of the grains is dried particularly quickly. The advantages of this process are the even flow of the feed air around the individual grains and their great relative speed during transport against the force of gravity. The fact that, during the pneumatic conveyance process, the individual grains are at a large distance from one another (about 5 to 10 grain diameters) and are always in movement, so that adherence of the grains cannot occur during drying, is of great benefit here for good treatment. Since the seed is airborne during this process, the drying is, in addition, very gentle, without a strong mechanical abrasion occurring. The residence time in the plant is preferably a maximum of 10 seconds and particularly about 3 to 6 seconds, the seed only being able to take up small amounts of water by absorption.

Seed grains, such as, for example, rape, cereal or maize seed grains, can be dressed and/or encrusted with the conventional active compounds using the process according to the invention. Examples which may be mentioned of active compounds which may be employed are: triadimenol, mercaptodimethur, bitertanol, fuberidazol, imazalil, thiram and/or other active compounds and combinations thereof.

In general, 200 g to 600 g of active compound are employed per liter of dressing and/or encrusting liquid.

Figure 1:
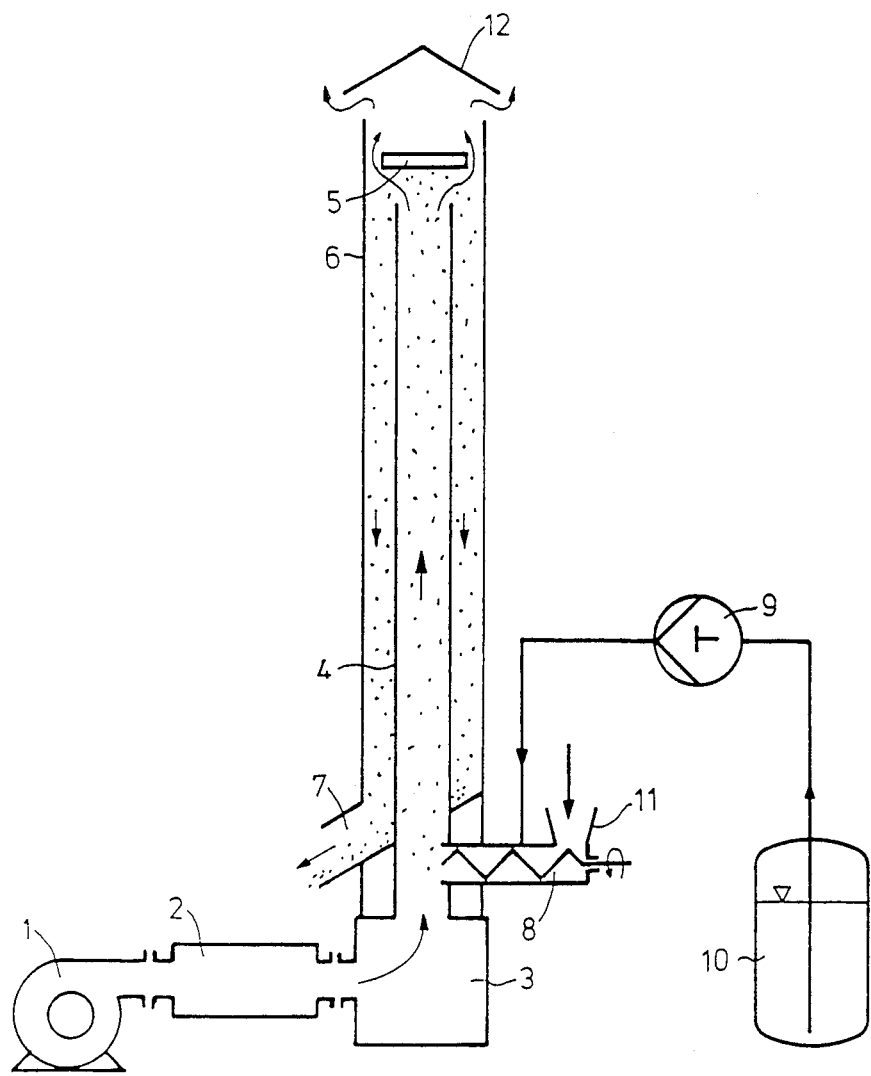
FIG. 1 shows an illustrative embodiment of the process according to the invention. This is a plant having a capacity for dressing 6000 kg of seed per hour.

According to FIG. 1, the plant comprises a ventilator (1), having around 4000 m$^3$/hour of air and delivering a 400 mm water column pressure, having an 80 kW air prewarmer (2), the air distributor (3) measuring 600×600×600 mm, the ascending pipe (4) of diameter 360 mm and length 10 m, the separator (5), the downpipe (6) with cap (12), a chute (7), and the brush-type worm (8) with hopper (11), the brush-type worm pipe having a diameter of 120 mm and a length of 2 m, and the metering pump (9). The dressing liquid is located in the container (10).

The seed is fed into the worm (8), the dressing liquid is metered in using the pump (9), and the dressing is rolled onto the grains using the worm. After introduction into the conveyor pipeline (4), the grains are caught by the air stream at temperatures of 80° C. and accelerated vertically upwards. The air speed here should preferably be about 30 to 50% greater than the sink rate of the grains. This relation can easily be fulfilled by adjusting the air stream. The air with dust and rubbed-off material is separated from the grain in the separator and sifter (5). The dried and cleaned grains then fall through the downpipe (6) onto the chute (7), where they are sacked.

As already mentioned above, 6000 kg of seed can be input per hour (position 11). The brush-type worm pipe (8) has a length of 2 m and a diameter of 120 mm. The brush-type worm makes 1200 revolutions per minute. The throughput of the dressing and/or encrusting liquid to be applied to the seed is preferably regulated by means of the speed of the brush-type worm. The height of the pneumatic conveyor section (vertical tower 12) is about 10 meters. The diameter of the downpipe (6) is 700 mm, the diameter of the ascending pipe (4), coaxial with the latter, is 360 mm. The pipe sections employed in the plant preferably comprise plastic having good heat-insulating properties, for example polypropylene. Besides this illustrative embodiment, other versions of the process according to the invention can also be realized, of course. Thus, for example, a cyclone or baffle separator can be used in the apparatus just described in place of the separator (5) conceived as a baffle plate.

Furthermore, the drying can be intensified by additional ascensional flow of warm air (preferably 80° to 100° C.) through the downpipe (6).

Another version comprises using a downpipe which is arranged in parallel and connected via a manifold, or other pipe arrangements, in place of the coaxial pipes.

Furthermore, the collection and separation of air and seed can be carried out only at the end of the section at (7).

Another possible application of the process according to the invention comprises using the drying section as an additional process for a commercially available dressing machine, in which, however, a great amount of water is used.

What is claimed is:

1. A process for dressing seed grains, wherein the seed grains are treated for a short period with an aqueous dressing liquid and the seed grains thus treated are subsequently dried very rapidly in a pneumatic conveyor pipeline and wherein the pneumatic conveyor pipeline is arranged vertically and a stream of air, flowing against the force of gravity, is blown in and wherein said pneumatic conveyor pipeline comprises an ascending pipe, a separator and a downpipe and wherein said seeds after treatment with an aqueous dressing pass upwardly through the ascending pipe, dust and air are separated from said seeds in the separator and the seeds fall through the downpipe.

2. A process according to claim 1, wherein the dressing solution contains 1 to 2.5 liters of water per 100 kg of seed grains.

3. A process according to claim 1, wherein the treatment of the seed grains with the aqueous dressing liquid is carried out using a rapidly rotating brush-type worm and the treatment time in the brush-type worm is a maximum of 10 seconds per seed grain.

4. A process according to claim 1, wherein the drying time of a seed grain in the pneumatic conveyor pipeline is a maximum of 10 seconds.

5. A process according to claim 3, wherein the stream of air is regulated in such a fashion that the speed of the air is 30 to 50 percent greater than the sink rate of the seed grains.

6. A process according to claim 1, wherein the dressing liquid is applied without using a spraying device.

7. A process according to claim 1, wherein the throughput of the dressing liquid to be applied to the seed is regulated by the speed of the rotating brush-type worm.

8. A process for dressing seed grains, wherein the seed grains are treated for a maximum of ten seconds per seed grain thereby using a rapidly rotating brush-type worm, with an aqueous dressing liquid containing 1 to 2.5 liters of water per 100 kg of seed grains, and drying the seed grains thus treated in a pneumatic conveyor pipeline for a maximum of ten seconds per seed grain.

* * * * *